US011217781B2

(12) United States Patent
Xiao

(10) Patent No.: US 11,217,781 B2
(45) Date of Patent: Jan. 4, 2022

(54) METHODS FOR MANUFACTURING ELECTRODES INCLUDING FLUOROPOLYMER-BASED SOLID ELECTROLYTE INTERFACE LAYERS

(71) Applicant: GM GLOBAL TECHNOLOGY OPERATIONS LLC, Detroit, MI (US)

(72) Inventor: Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 298 days.

(21) Appl. No.: 16/377,814

(22) Filed: Apr. 8, 2019

(65) Prior Publication Data

US 2020/0321603 A1    Oct. 8, 2020

(51) Int. Cl.
*H01M 4/04*     (2006.01)
*H01M 4/134*    (2010.01)
(Continued)

(52) U.S. Cl.
CPC ....... *H01M 4/0471* (2013.01); *H01M 4/0402* (2013.01); *H01M 4/134* (2013.01);
(Continued)

(58) Field of Classification Search
CPC .. H01M 4/0471; H01M 4/0402; H01M 4/134; H01M 4/1395; H01M 2004/027
See application file for complete search history.

(56) References Cited

U.S. PATENT DOCUMENTS

| | | |
|---|---|---|
| 6,759,164 B2 | 7/2004 | Palazzo et al. |
| 8,974,946 B2 | 3/2015 | Cai et al. |

(Continued)

FOREIGN PATENT DOCUMENTS

| | | |
|---|---|---|
| CN | 111799433 A | 10/2020 |
| DE | 102018121026 A1 | 2/2019 |

(Continued)

OTHER PUBLICATIONS

Elena Markevich, Gregory Salitra, and Daron Aurbach, "Fluoroethylene Carbonate as an Important Component for the Formation of an Effective Solid Electrolyte Interphase on Anodes and Cathodes for Advcanced Li-ion Batteries", May 5, 2017, ACS Energy Letters 2017, 2, 1337-1345. (Year: 2017).*

(Continued)

*Primary Examiner* — Jonathan G Jelsma
(74) *Attorney, Agent, or Firm* — Harness, Dickey & Pierce, P.L.C.

(57) ABSTRACT

Methods for manufacturing electrodes include applying a fluoropolymer film to a lithium-based host material, defluorinating the fluoropolymer film by heating to produce a lithium electrode having a solid electrolyte interface (SEI) layer including defluorinated fluoropolymers and at least about 5 wt. % LiF. The fluoropolymers can include one or more of fluorinated ethylenepropylene, perfluoroalkoxy alkanes, vinylidenefluoride, and copolymers of perfluoromethylvinylether and tetrafluoroethylene. The fluoropolymers can include one or more fluorinated monomers, including hexafluoropropylene, tetrafluoroethylene, ethylene-tetrafluoroethylene, perfluoroethers, and vinylidene fluoride. The $—CF_3$ functional groups of the defluorinated fluoropolymers can be about 3 wt. % to about 10 wt. % of the SEI layer. The SEI layer can include about 30 wt. % to about 50 wt. % LiF. The method can include assembling a battery cell by disposing a battery separator between a cathode and the electrode, and disposing the battery separator, the cathode, and the electrode in an electrolyte.

19 Claims, 3 Drawing Sheets

(51) Int. Cl.
*H01M 4/62* (2006.01)
*H01M 10/052* (2010.01)
*H01M 10/0585* (2010.01)
*H01M 4/38* (2006.01)
*H01M 4/02* (2006.01)

(52) U.S. Cl.
CPC ........... *H01M 4/382* (2013.01); *H01M 4/628* (2013.01); *H01M 10/052* (2013.01); *H01M 10/0585* (2013.01); *H01M 2004/027* (2013.01)

(56) References Cited

U.S. PATENT DOCUMENTS

| | | |
|---|---|---|
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,537,144 B2 | 1/2017 | Huang et al. |
| 9,647,254 B2 | 5/2017 | Dadheech et al. |
| 9,742,028 B2 | 8/2017 | Zhou et al. |
| 9,887,429 B2 | 2/2018 | Shih et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,573,879 B2 | 2/2020 | Yang et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 10,991,946 B2 | 4/2021 | Xiao et al. |
| 2011/0236567 A1 | 9/2011 | Kuriki |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0349307 A1 | 12/2015 | Dadheech et al. |
| 2016/0111721 A1 | 4/2016 | Xiao et al. |
| 2016/0164060 A1 | 6/2016 | Zhang et al. |
| 2016/0172706 A1 | 6/2016 | Xiao et al. |
| 2016/0172710 A1 | 6/2016 | Liu et al. |
| 2016/0204476 A1* | 7/2016 | Kobayashi ........... H01M 50/449 429/144 |
| 2017/0271678 A1 | 9/2017 | Yang et al. |
| 2019/0067675 A1 | 2/2019 | Xiao |
| 2019/0312254 A1 | 10/2019 | Xiao |
| 2019/0326070 A1 | 10/2019 | Dai et al. |
| 2019/0393549 A1 | 12/2019 | Yersak et al. |
| 2020/0052338 A1 | 2/2020 | Liu et al. |

FOREIGN PATENT DOCUMENTS

| | | |
|---|---|---|
| DE | 102019107934 A1 | 10/2019 |
| EP | 2589684 A1 | 5/2013 |
| JP | H10134819 A | 5/1998 |
| JP | 4516206 B2 | 8/2010 |
| JP | 2013054743 A | 3/2013 |
| KR | 20120086126 A | 8/2012 |
| KR | 20130053818 A | 5/2013 |
| KR | 20150063620 A | 6/2015 |
| WO | WO-2017045573 A1 | 3/2017 |
| WO | WO-2018164094 A1 * | 9/2018 ............ H01G 11/70 |

OTHER PUBLICATIONS

Soshi Shiraishi and Osamu Tanaike, "Application of Carbon Materials Derived from Fluorocarbons in an Electrochemical Capacitor", May 8, 2015, Advanced Fluoride-Based Materials for Energy Conversion, pp. 415-430. (Year: 2015).*

Xue-Xiang Zhang, Xin-Bing Cheng, Xiang Chen, Chong Yan, and Qiang Zhang, "Fluoroethylene Carbonate Additives to Render Uniform Li Deposits in Lithium Metal Batteries", Advanced Functional Materials, 2017, 27, 1605989. (Year: 2017).*

German Office Action for application No. 10 2019 115 448.0 dated Dec. 20, 2019, 5 pages.

Fan, Xiulin et al., "Highly Fluorinated Interphases Enable High-Voltage Li-Metal Batteries." Chem: Cell Press, vol. 4, No. 1, pp. 174-185 (2018).

* cited by examiner

METHODS FOR MANUFACTURING ELECTRODES INCLUDING FLUOROPOLYMER-BASED SOLID ELECTROLYTE INTERFACE LAYERS

GOVERNMENT SUPPORT

This invention was made with government support under DE-0007787 awarded by the Department of Energy. The government has certain rights in the invention.

INTRODUCTION

Lithium ion batteries describe a class of rechargeable batteries in which lithium ions move between a negative electrode (i.e., anode) and a positive electrode (i.e., cathode). Liquid, solid, and polymer electrolytes can facilitate the movement of lithium ions between the anode and cathode. Lithium-ion batteries are growing in popularity for defense, automotive, and aerospace applications due to their high energy density and ability to undergo successive charge and discharge cycles. Large volume changes and high reactivity of Li metal electrode can lead to "mossy" lithium structures and/or lithium dendrite growth, which can reduce the cycle efficiency and applications of such Li-ion batteries.

SUMMARY

Provided are methods for manufacturing electrodes. The methods include providing an electrode including a current collector and a lithium-based host material applied thereto, applying a fluoropolymer film including one or more fluoropolymers to an exposed surface of the lithium-based host material, and defluorinating the fluoropolymer film by heating to produce a lithium electrode having a solid electrolyte interface (SEI) layer including defluorinated fluoropolymers and at least about 5 wt. % LiF. The one or more fluoropolymers can include one or more of fluorinated ethylene propylene (FEP), perfluoroalkoxy alkanes (PFA), vinylidene fluoride (THV), and copolymers of perfluoromethylvinylether and tetrafluoroethylene (MFA). The fluoropolymer film can include one or more fluoropolymers selected from the group consisting of fluorinated ethylene propylene (FEP), perfluoroalkoxy alkanes (PFA), vinylidene fluoride (THV), and copolymers of perfluoromethylvinylether and tetrafluoroethylene (MFA). The one or more fluoropolymers can include one or more fluorinated monomers, wherein the fluorinated monomers include hexafluoropropylene, tetrafluoroethylene, ethylene-tetrafluoroethylene, perfluoroethers, and vinylidene fluoride. The —$CF_3$ functional groups of the one or more fluoropolymers can be at least about 10 wt. % of the fluoropolymer film as applied to the lithium-based host material. The —$CF_3$ functional groups of the one or more defluorinated fluoropolymers can be about 3 wt. % to about 10 wt. % of the SEI layer. The SEI layer can include about 30 wt. % to about 50 wt. % LiF. The lithium-based host material can include at least about 50 wt. % lithium. The heating can occur below the melting point of the lithium-based host material. The methods can further include removing a natural passivation layer from the exposed surface of the lithium-based host material onto which the fluoropolymer film is subsequently applied.

Methods for manufacturing battery cells are also provided. The methods include providing an anode including a current collector and a lithium-based host material applied thereto, applying a fluoropolymer film including one or more fluoropolymers to a plurality of exposed surfaces of the lithium-based host material, defluorinating the fluoropolymer film by heating to produce a lithium anode having a solid electrolyte interface (SEI) layer including defluorinated fluoropolymers and at least about 5 wt. % LiF, and subsequently assembling the battery cell. The battery cell can be assembled by disposing a battery separator between a cathode and the lithium anode, and disposing the battery separator, the cathode, and the lithium anode in an electrolyte. The electrolyte can be a liquid electrolyte. Applying can be conducted under a vacuum and/or in an inert atmosphere. The one or more fluoropolymers can be applied to the plurality of exposed surfaces of the lithium-based host material via a plasma-based process, and the heating can at least partially occur during the applying. The methods can further include removing a natural passivation layer from the lithium-based host material prior to applying, wherein the heating that occurs during the applying effects a suitable extent of defluorination of the fluoropolymer film. The methods can further include, after applying, transporting and/or storing the lithium anode in a non-inert environment prior to defluorinating. The one or more fluoropolymers can be applied to the plurality of the exposed surfaces of the lithium-based host material via thermal evaporation or electron beam evaporation. The plurality of exposed surfaces of the lithium-based host material each can include a passivation layer, and the plurality of passivation layers are not removed prior to applying. The —$CF_3$ functional groups of the one or more fluoropolymers can be at least about 10 wt. % of the fluoropolymer film as applied to the lithium-based host material. The SEI layer can include about 30 wt. % to about 50 wt. % LiF.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are methods for forming lithium anodes comprising solid electrolyte interface (SEI) layers. The SEI layers described herein suppress or prevent the growth of Li dendrites and/or "mossy" structures during battery cycling, and exhibit flexible properties which lend mechanical protection to the lithium anodes and appurtenant battery cell structures. Further, the methods for forming the SEI layers create hydrophobic electrode intermediary products, which allow the same to be transported and/or stored in non-inert environments between manufacturing steps. The SEI layers and methods for forming the same described herein generally include applying one or more fluoropolymers to a lithium-based host material, and utilizing the direct contact between the fluoropolymer and the lithium-based host material, and heat, to effect defluorination of the fluropolymer(s).

Figure 1:
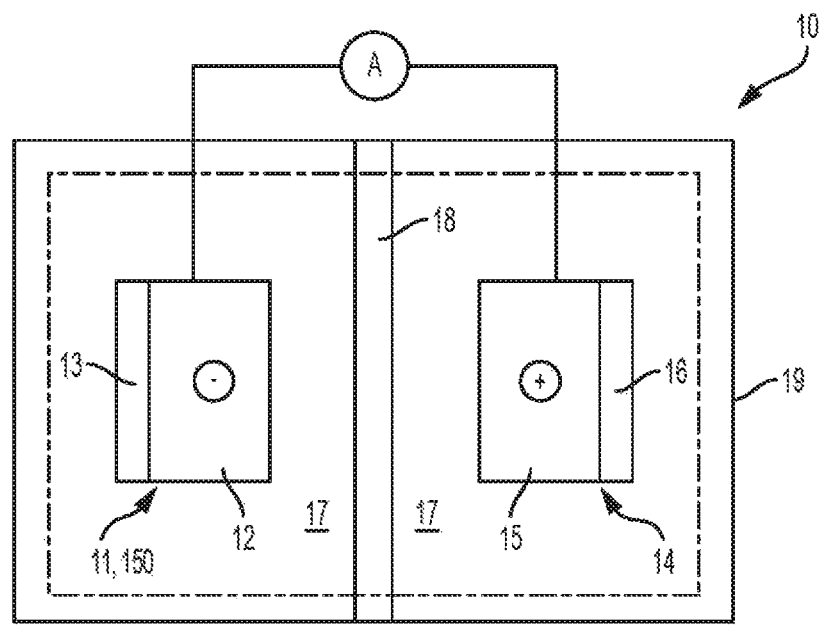
FIG. 1 illustrates a lithium battery cell, according to one or more embodiments.

FIG. 1 illustrates a lithium battery cell 10 comprising a negative electrode (i.e., the anode) 11, a positive electrode (i.e., the cathode) 14, an electrolyte 17 operatively disposed between the Anode 11 and the cathode 14, and a separator 18. Anode 11, cathode 14, and electrolyte 17 can be encapsulated in container 19, which can be a hard (e.g., metallic) case or soft (e.g., polymer) pouch, for example. The Anode 11 and cathode 14 are situated on opposite sides of separator 18 which can comprise a microporous polymer or other suitable material capable of conducting lithium ions and optionally electrolyte (i.e., liquid electrolyte). Electrolyte 17 is a liquid electrolyte comprising one or more lithium salts dissolved in a non-aqueous solvent. Anode 11 generally includes a current collector 12 and a lithium intercalation host material 13 applied thereto. Cathode 14 generally includes a current collector 15 and an active material 16 applied thereto. For example, the battery cell 10 can comprise a chalcogen active material 16 or a lithium metal oxide active material 16, among many others, as will be described below. Active material 16 can store lithium ions at a higher electric potential than intercalation host material 13, for example. The current collectors 12 and 15 associated with the two electrodes are connected by an interruptible external circuit that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the anode 11 and cathode 14, respectively, and electrolyte 17.

Figure 2:
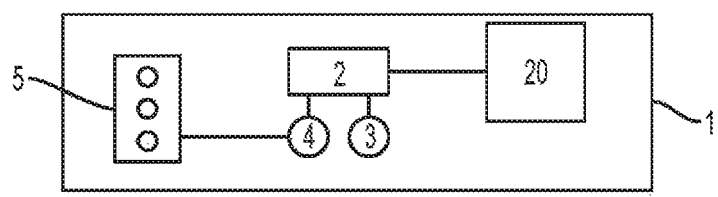
FIG. 2 illustrates a schematic diagram of a hybrid-electric vehicle, according to one or more embodiments.

Battery cell 10 can be used in any number of applications. For example, FIG. 2 illustrates a schematic diagram of a hybrid-electric or electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1 via one or more wheels (not shown). An optional engine 5 can be used to drive a generator 4, which in turn can provide energy to recharge the battery pack 20 via the inverter 2. In some embodiments, drive motor 3 and generator 4 comprise a single device (i.e., a motor/generator). External (e.g., grid) power can also be used to recharge the battery pack 20 via additional circuitry (not shown). Engine 5 can comprise a gasoline or diesel engine, for example.

Battery cell 10 generally operates by reversibly passing lithium ions between Anode 11 and cathode 14. Lithium ions move from cathode 14 to Anode 11 while charging, and move from Anode 11 to cathode 14 while discharging. At the beginning of a discharge, Anode 11 contains a high concentration of intercalated/alloyed lithium ions while cathode 14 is relatively depleted, and establishing a closed external circuit between Anode 11 and cathode 14 under such circumstances causes intercalated/alloyed lithium ions to be extracted from Anode 11. The extracted lithium atoms are split into lithium ions and electrons as they leave an intercalation/alloying host at an electrode-electrolyte interface. The lithium ions are carried through the micropores of separator 18 from Anode 11 to cathode 14 by the ionically conductive electrolyte 17 while, at the same time, the electrons are transmitted through the external circuit from Anode 11 to cathode 14 to balance the overall electrochemical cell. This flow of electrons through the external circuit can be harnessed and fed to a load device until the level of intercalated/alloyed lithium in the negative electrode falls below a workable level or the need for power ceases.

Battery cell 10 may be recharged after a partial or full discharge of its available capacity. To charge or re-power the lithium ion battery cell, an external power source (not shown) is connected to the positive and the negative electrodes to drive the reverse of battery discharge electrochemical reactions. That is, during charging, the external power source extracts the lithium ions present in cathode 14 to produce lithium ions and electrons. The lithium ions are carried back through the separator by the electrolyte solution, and the electrons are driven back through the external circuit, both towards Anode 11. The lithium ions and electrons are ultimately reunited at the negative electrode, thus replenishing it with intercalated/alloyed lithium for future battery cell discharge.

Lithium ion battery cell 10, or a battery module or pack comprising a plurality of battery cells 10 connected in series and/or in parallel, can be utilized to reversibly supply power and energy to an associated load device. Lithium ion batteries may also be used in various consumer electronic devices (e.g., laptop computers, cameras, and cellular/smart phones), military electronics (e.g., radios, mine detectors, and thermal weapons), aircrafts, and satellites, among others. Lithium ion batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Returning to FIG. 1, electrolyte 17 conducts lithium ions between anode 11 and cathode 14, for example during charging or discharging the battery cell 10. The electrolyte 17 comprises one or more solvents, and one or more lithium salts dissolved in the one or more solvents. Suitable solvents can include cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,3-dimethoxypropane, 1,2-dimethoxyethane (DME), 1,2-diethoxyethane, ethoxymethoxyethane), cyclic ethers (tetrahydrofuran, 2-methyltetrahydrofuran, 1,3-dioxolane), and combinations thereof. A non-limiting list of lithium salts that can be dissolved in the organic solvent(s) to form the non-aqueous liquid electrolyte solution include $LiClO_4$, $LiAlCl_4$, LiI, LiBr, LiSCN, $LiBF_4$, $LiB(C_6H_5)_4LiAsF_6$, $LiCF_3SO_3$, $LiN(CF_3SO_2)_2$, $LiN(FSO_2)_2$, $LiPF_6$, and mixtures thereof.

Active material 16 can include any lithium-based active material that can sufficiently undergo lithium intercalation and deintercalation while functioning as the positive terminal of battery cell 10. Active material 16 can also include a polymer binder material to structurally hold the lithium-based active material together. The active material 16 can comprise lithium transition metal oxides (e.g., layered lithium transitional metal oxides) or chalcogen materials, for example, and other suitable materials described herein or known in the art. Cathode current collector 15 can include aluminum or any other appropriate electrically conductive material known to skilled artisans, and can be formed in a foil or grid shape. Cathode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others. The same highly electrically conductive materials can additionally or alternatively be dispersed within the host material 13.

Lithium transition metal oxides suitable for use as active material 16 can comprise one or more of spinel lithium manganese oxide ($LiMn_2O_4$), lithium cobalt oxide ($LiCoO_2$), a nickel-manganese oxide spinel ($Li(Ni_{0.5}Mn_{1.5})O_2$), a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese oxide spinel is $xLi_2MnO_3 \cdot (1-x)Li(Ni_{1/3}Mn_{1/3}Co_{1/3})O_2$. Other suitable lithium-based active materials include $Li(Ni_{1/3}Mn_{1/3}Co_{1/3})O_2$), $LiNiO_2$, $Li_{x+y}Mn_{2-y}O_4$ (LMO, 0<x<1 and 0<y<0.1), or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), $LiNi_{1-x}Co_{1-y}Mn_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.05}Al_{0.05}O_2$ or NCA), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), and any other high efficiency nickel-manganese-cobalt material (HE-NMC, NMC or $LiNiMnCoO_2$). By "any ratio" it is meant that any element may be present in any amount. So, for example, M could be Al, with or without Co and/or Mg, or any other combination of the listed elements. In another example, anion substitutions may be made in the lattice of any example of the lithium transition metal based active material to stabilize the crystal structure. For example, any O atom may be substituted with an F atom.

Chalcogen-based active material 16 can include one or more sulfur and/or one or more selenium materials, for example. Sulfur materials suitable for use as active material 16 can comprise sulfur carbon composite materials, $S_8$, $Li_2S_8$, $Li_2S_6$, $Li_2S_4$, $Li_2S_2$, $Li_2S$, $SnS_2$, and combinations thereof. Another example of sulfur-based active material includes a sulfur-carbon composite. Selenium materials suitable for use as active material 16 can comprise elemental selenium, $Li_2Se$, selenium sulfide alloys, $SeS_2$, $SnSe_xS_y$ (e.g., $SnSe_{0.5}S_{0.5}$) and combinations thereof. The chalcogen-based active material of the positive electrode 22' may be intermingled with the polymer binder and the conductive filler. Suitable binders include polyvinylidene fluoride (PVDF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders. The polymer binder structurally holds the chalcogen-based active material and the conductive filler together. An example of the conductive filler is a high surface area carbon, such as acetylene black or activated carbon. The conductive filler ensures electron conduction between the positive-side current collector 26 and the chalcogen-based active material. In an example, the positive electrode active material and the polymer binder may be encapsulated with carbon. In an example, the weight ratio of S and/or Se to C in the positive electrode 22' ranges from 1:9 to 9:1.

The anode current collector 12 can include copper, aluminum, stainless steel, or any other appropriate electrically conductive material known to skilled artisans. Anode current collector 12 can be treated (e.g., coated) with highly electrically conductive materials, including one or more of conductive carbon black, graphite, carbon nanotubes, carbon nanofiber, graphene, and vapor growth carbon fiber (VGCF), among others. The host material 13 applied to the anode current collector 12 can include any lithium host material that can sufficiently undergo lithium ion intercalation, deintercalation, and alloying, while functioning as the negative terminal of the lithium ion battery 10. Furthermore, host material 13 comprises a sufficient amount of lithium to effect suitable defluorination of the anode 11 SEI layer, as will be described below. For example, in some embodiments host material 13 comprises at least 50 wt. % lithium. In some embodiments, the host material 13 comprises pure lithium (e.g., >99.9 wt. % lithium). In some embodiments, the host material 13 comprises a lithium-aluminum alloy (e.g., LiAl, $Al_2Li_3$, $Al_4Li_9$), a lithium-silicon alloy (e.g., $Li_{22}Si_5$, $Li_{15}Si_4$, $Li_{13}Si_4$, $Li_7Si_3$, $Li_{12}Si_{17}$, LiSi), a lithium-tin alloy (e.g., $Li_{22}Sn_5$, $Li_{15}Sn_4$, $Li_{13}Sn_4$, $Li_7Sn_3$, $Li_{12}Sn_{17}$, LiSn, $Li_2Sn_5$), a lithium-zinc alloy (e.g., LiZn, $Li_2Zn_3$, $LiZn_2$, $Li_2Zn_5$, $LiZn_4$), or a lithium-Germanium (e.g., $GeLi_3$, $Ge_5Li_{22}$), for example.

Silicon has the highest known theoretical charge capacity for lithium, making it one of the most promising anode host materials 13 for rechargeable lithium-ion batteries. In two general embodiments, a silicon host material 13 can comprise Si particles, or $SiO_x$ particles. $SiO_x$ particles, wherein generally x≤2, can vary in composition. In some embodiments, for some $SiO_x$ particles, x≈1. For example, x can be about 0.9 to about 1.1, or about 0.99 to about 1.01. Within a body of $SiO_x$ particles, $SiO_2$ and/or Si domains may further exist. Silicon host material 13 comprising Si particles or $SiO_x$ particles can comprise average particle diameters of about 20 nm to about 20 μm, among other possible sizes.

Figure 3:
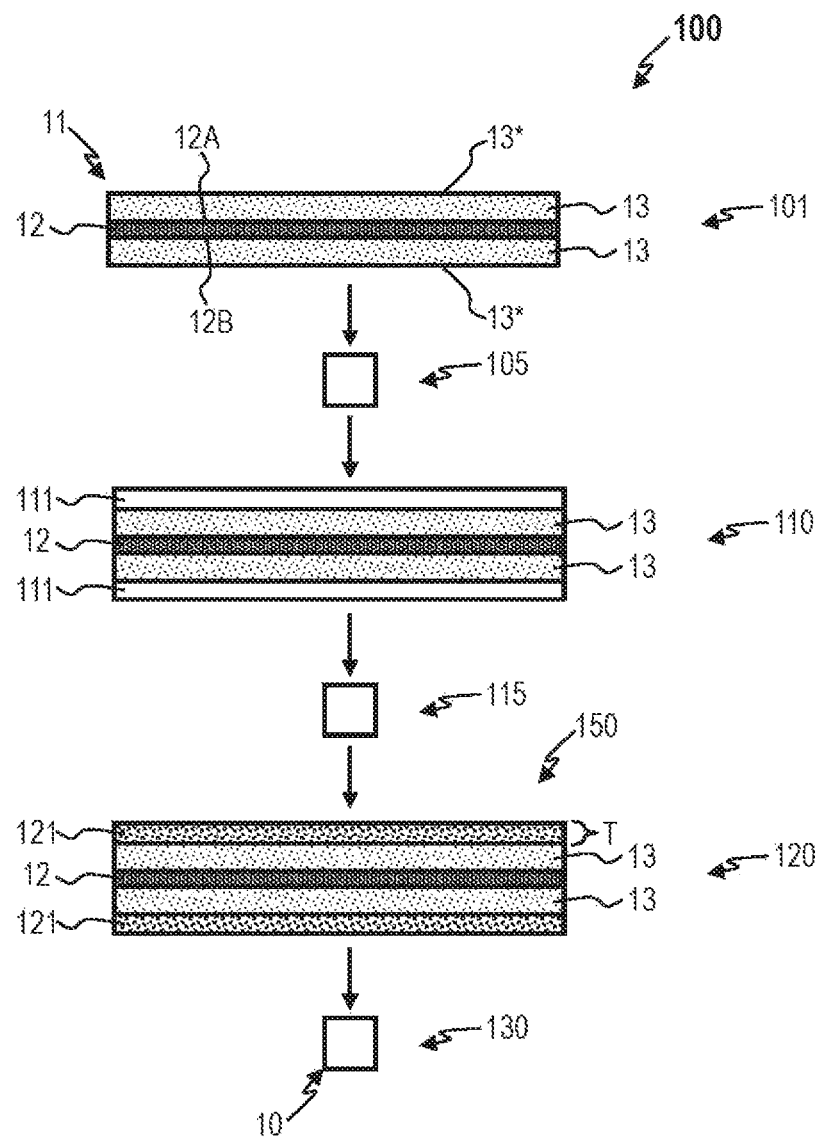
FIG. 3 illustrates a schematic diagram of a method for forming electrodes and appurtenant battery cells, according to one or more embodiments.

FIG. 3 illustrates a method 100 for forming electrodes (e.g., anodes 11), and appurtenant battery cells, having SEI layers formed on the anode 11 host material 13. Method 100 comprises providing 101 an anode 11 comprising a current collector 12 and a lithium-based host material 13 applied thereto, applying 110 one or more fluoropolymer films 111 to the lithium-based host material 13, and defluorinating 120 the one or more fluoropolymer films 111 to produce a lithium anode 150 having one or more SEI layers 121.

The provided 101 anode 11 includes a current collector 12 having one or more faces (e.g., a first current collector face 12A and a second current collector face 12B), and the lithium-based host material 13 can be applied to the one or more current collector faces. The lithium-based host material 13 can have one or a plurality of exposed surfaces 13*, and the fluoropolymer film 111 can be applied 110 to one, a plurality, or all of the exposed surfaces 13* of the lithium-based host material 13. In some embodiments, the one or a plurality of exposed surfaces 13 * comprise an outer passivation layer (e.g., up to 5 nm in thickness) including lithium oxides, lithium hydroxide, lithium nitride, and/or lithium carbonate, for example. Because lithium is very reactive, passivation layers can form on the one or more exposed surfaces 13* if the anode 11 is not maintained in an inert environment or vacuum prior to applying 110, for example. Method 100 can optionally comprise removing 105 one or more passivation layers from the lithium-based host material 13 prior to applying 110. The one or more passivation layers can be removed 105 mechanically (e.g., via a brush or blade), for example. However, the formation of SEI layers 121 via method 100 advantageously obviates the need to remove one or more passivation layers.

The fluoropolymer film 111 applied 110 to the lithium-based host material 13 includes one or more fluoropolymers. Fluoropolymers can comprise one or more homopolymers and/or one or more copolymers having fluorinated monomers, wherein the fluorinated monomers can comprise hexafluoropropylene ($C_3F_6$), tetrafluoroethylene ($C_2F_4$), ethylene-tetrafluoroethylene ($C_4F_8$), perfluoroethers ($C_2F_3OR$, where R is a perfluorinated group), and vinylidene fluoride ($C_2H_2F_2$). Suitable copolymers can include, for example, fluorinated ethylene propylene (FEP)—a copolymer of hexafluoropropylene and tetrafluoroethylene, perfluoroalkoxy alkanes (PFA)—copolymers of tetrafluoroethylene and perfluoroethers, terpolymer of tetrafluoroethylene, hexafluoropropylene, and vinylidene fluoride (THV), and copolymers of perfluoromethylvinylether ($C_2F_3OR$, where R is a perfluorinated $CF_3$ group) and tetrafluoroethylene (MFA), among others. For example, FEP can have a molecular weight of about 241,000 to about 575,000. For example, PFA can have a molecular weight of about 200,000 to about 450,000. For example, THV can have a molecular weight of about 150,000 to about 500,000. For example, MFA can have a molecular weight of about 200,000 to about 475,000.

Suitable homopolymers can include polytetrafluoroethylene (PTFE)—a homopolymer of tetrafluoroethylene, polyvinylidene fluoride (PVDF)—a homopolymer of vinylidene fluoride, and polyhexafluoropropylene (PHFP)—a homopolymer of hexafluoropropylene. In some embodiments, in order to effect suitable defluorination of the fluoropolymer film 111, the —$CF_3$ functional groups of the fluoropolymer film 111 must comprise at least about 7.5 wt. %, at least about 10 wt. %, or about 10 wt. % to about 30 wt. % of the fluoropolymer film 111. Accordingly, in some instances wherein the fluoropolymer film includes one or more of the above homopolymers, other fluoropolymers must be included such that a suitable amount of —$CF_3$ functional groups of the one or more fluoropolymers is achieved in the fluoropolymer film 111. For example, the fluoropolymer film 111 can include one or more fluoropolymers and the —$CF_3$ functional groups of the one or more fluoropolymers comprise at least 10 wt. % of the fluoropolymer film 111 as applied to the lithium-based host material 13. In some embodiments, the fluoropolymer film 111 as applied to the lithium-based host material 13 comprises one or more of FEP, PFA, THV, and MFA. In some embodiments, the fluoropolymer film 111 as applied to the lithium-based host material 13 comprises one or more fluoropolymers selected from the group consisting of FEP, PFA, THV, and MFA.

The fluoropolymer film 111 can be applied 110 by a variety of processes, and generally under a vacuum and/or in an inert atmosphere to avoid the formation of undesirable compounds on the lithium-based host material 13 exposed surface(s) 13*. An inert atmosphere is one which does not react with the lithium-based host material 13, and generally is substantially free of Na, $O_2$, $H_2O$, $H_2S$, CO, and $CO_2$. For example, an inert atmosphere can comprise He and/or Ar, for example. The fluoropolymer film can be applied 110 via thermal evaporation (e.g., in an inert environment or in a vacuum), electron beam evaporation (e.g., in a vacuum), or via a plasma-based process. Plasma-based processes can include magnetron sputtering (e.g., in a vacuum), cathodic arc deposition (e.g., in a vacuum), and ion-beam physical vapor deposition (e.g., in a vacuum), among others.

The applied 110 fluoropolymer film 111 is then defluorinated 120, for example by heating, to form one or more SEI layers 121 comprising a polymer matrix imbedded with LiF. Heating generally encourages the migration of lithium into the contiguous fluoropolymer film 111 (and optionally through the passivation layer, if present) and the defluorination 120 of the one or more fluoropolymers to form LiF. Heating can occur below the melting point of the lithium-based host material (e.g., less than about 180° C. for a host material 13 comprising pure lithium). For example, heating can occur about temperatures from about 100° C. to about 180° C. Heating temperatures and/or durations can be tuned to achieve desired SEI layer 121 properties as described herein. If the fluoropolymer film 111 is applied 110 via a plasma-based process, defluorination 120 of the fluoropolymer film 111 can at least partially occur during the applying 110 due to the heat generated from the plasma-based process. In some embodiments, a suitable extent of defluorination 120 of the fluoropolymer film 111 can be effected entirely during applying 110 via a plasma-based process, particularly if any passivation layers are removed 105 prior to applying 110.

Prior to defluorinating 120, the fluoropolymer film 111 provides a dense, hydrophobic coating which protects the lithium-based host material 13 from non-inert species. Accordingly, an electrode (e.g., anode 11) with a fluoropolymer film 111 applied thereto can optionally be transported and/or stored 115 in various non-inert environments (e.g., humid, open air) before defluorinating 120, advantageously lending flexibility to a manufacturing process. In embodiments of method 100 wherein an electrode (e.g., anode 11) with a fluoropolymer film 111 applied thereto is transported and/or stored 115 in various non-inert environments before defluorinating 120, it may be advantageous not to remove a passivation layer from the lithium-based host material 13 prior to applying 110, in order to prevent or minimize defluorination 120 (and accordingly reduction in hydrophobic properties) of the fluoropolymer film 111 prior to transporting and/or storing 115.

As previously mentioned, defluorinating 120 forms one or more SEI layers 121 comprising a polymer matrix imbedded with LiF. The presence of LiF in the SEI layers 121 beneficially passivates the surface of the lithium-based host material 13, and further suppresses or prevents decomposition of electrolyte 17. Typically defluorinating 120 comprises partially defluorinating the one or more fluoropolymers of the fluoropolymer film 111 such that the resulting polymer matrix of the SEI layer 121 comprises at least about 5 wt. % LiF, or about 5 wt. % to 75 wt. % LiF. Higher concentrations of LiF in the SEI layer 121 polymer matrix reduce the flexibility (i.e., and the beneficial mechanical properties) and the ionic conductivity thereof, and therefore in some embodiments the SEI layer 121 polymer matrix comprises about 30 wt. % to about 50 wt. % LiF, about 35 wt. % to about 45 wt. % LiF, or about 40 wt. % LiF. The LiF can be present within the polymer matrix as nanocrystals. The LiF nanocrystals can have an average diameter of about 5 nm to about 500 nm, or up to about 400 nm. In some embodiments, the LiF nanocrystals can have an average diameter of about 10 nm to about 30 nm, or about 20 nm.

The polymer matrix of the SEI layer 121 further comprises fluoropolymers with —$CF_3$ functional groups. In some embodiments, the —$CF_3$ functional groups of the one or more defluorinated fluoropolymers comprise at least about 3 wt. %, or about 3 wt. % to about 10 wt. % of the SEI layer. In general, the wt. % of —$CF_3$ functional groups in the one or more defluorinated fluoropolymers of the SEI layer will decrease relative to the wt. % of —$CF_3$ functional groups of the fluoropolymers as applied to the lithium-based host material 13 (i.e., prior to defluorinating 120). Accordingly, in some embodiments —$CF_3$ functional groups of the one or more fluoropolymers comprise at least about 7.5 wt. %, at least about 10 wt. %, or at least about 12.5 wt. % of the fluoropolymer film 111 as applied to the lithium-based host material 13.

After defluorinating 120, method 100 can further comprise assembling 130 a battery cell (e.g., battery cell 10). Assembling 130 can comprise disposing a separator (e.g., separator 18) between a cathode (e.g., cathode 14) and the lithium anode 150, and disposing the battery separator, cathode, and lithium anode 150 in an electrolyte (e.g., electrolyte 17). The electrolyte can be a liquid electrolyte, as discussed above. Battery cell 10, comprising anode 150, can be utilized by electric vehicle 1, for example. In some lithium ion batteries, a liquid electrolyte may contain fluroethylene carbonate (FEC) so that during initial battery cycling FEC is consumed to form an SEI layer on the anode. Because the consumption of FEC can generate gaseous species within a battery cell, the battery cell 10 described herein may advantageously utilized an electrolyte 17 which is free from FEC.

As thickness T of the SEI layer(s) 121 increases, the ionic conductivity of the SEI layer(s) 121 and the volumetric energy density of the battery cell decreases, and the mechanical strength (e.g., impact resistance) of the battery cell increases. Accordingly, the thickness T of the SEI layer(s) 121 can be tuned to the capacity (in $mAh/cm^2$) of a battery cell. For example, for a battery cell with a capacity of up to about 4 $mAh/cm^2$ of lithium-basted host material (e.g., in electric vehicle applications), the SEI layer 121 can have a thickness of about 200 nm to about 5 μm. In another example, for a battery cell with a capacity of up to about 2 $mAh/cm^2$ of lithium-basted host material (e.g., in portable electronic devices), the SEI layer 121 can have a thickness of about 100 nm to about 500 nm. In another example, for a battery cell with a capacity of up to about 1 $mmAh/cm^2$ of lithium-basted host material (e.g., in biomedical devices), the SEI layer 121 can have a thickness of about 50 nm to about 100 nm.

Example 1

An anode was made by applying 20 μm of pure lithium to a 10 μm thick copper foil current collector. The anode was disposed in a thermal evaporator chamber. Fluorinated polyethylene (FPE) was cut into pieces of about 2 mm by 1 cm by 1 cm and loaded into tantalum crucibles in the thermal evaporator chamber. The chamber was pumped down from 10 Torr to 3 Torr, and the crucible was heated to 300° C. before coating the lithium with FPE to a thickness of about 1 μm. The anode was subsequently heated treated.

Figure 4:
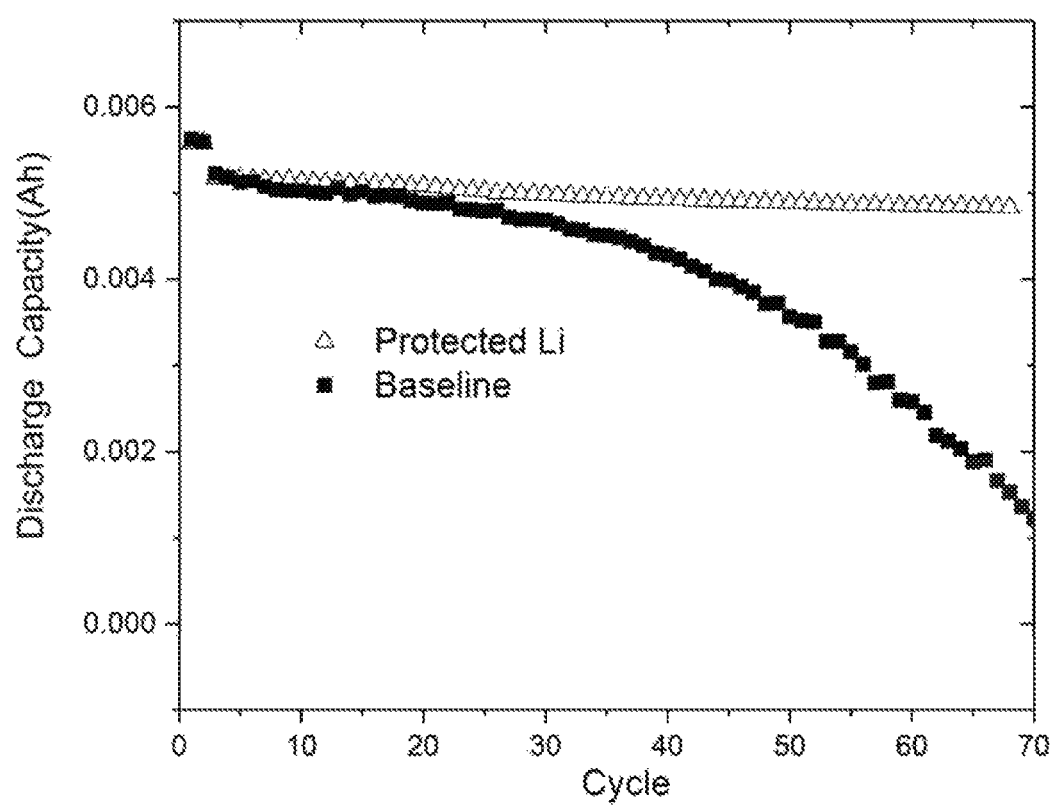
FIG. 4 illustrates a graph of discharge capacity vs. discharge cycle number for two coin cells, according to one or more embodiments.

Two coin cells were assembled in an Ar-filled glovebox: a first coin cell using 13.5 mm anodes as fabricated above and a second coin cell using an identical anode without the FPE coating. The first and second coin cells each used 13 mm diameter $Ni_{0.6}Mn_{0.2}Co_{0.2}O_2$ cathodes and 20 μL of electrolyte comprising ethylmethyl carbonate with 1 M $LiPF_6$. The cells were assembled in an argon filled glove box and cycled using an Arbin battery cycler (BT2000) at room temperature with a voltage window of 3 V to 4.3 V. The coin cells first went through two C/10 formation cycles with the cell current density at about 0.42 mA/cm2, followed with C/3 charge/discharge cycle for life tests with the cell current density at about 1.3 $mA/cm^2$. FIG. 4 illustrates a graph of discharge capacity vs. discharge cycle number for the first coin cell and the second coin cell. It can be seen that the first coin cell, utilizing the anode coated with FPE ("Protected Li") maintains a higher discharge capacity than the second cell ("Baseline") utilizing the uncoated anode, and exhibits substantially no diminishment of discharge capacity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for manufacturing an electrode, the method comprising:
   providing an electrode comprising a current collector and a lithium-based host material applied thereto;
   applying a fluoropolymer film including one or more fluoropolymers to an exposed surface of the lithium-based host material; and
   defluorinating the fluoropolymer film by heating to produce a lithium electrode having a solid electrolyte interface (SEI) layer comprising defluorinated fluoropolymers and at least about 5 wt. % LiF, wherein the heating occurs below the melting point of the lithium-based host material.

2. The method of claim 1, wherein the one or more fluoropolymers comprise one or more of fluorinated ethylene propylene (FEP), perfluoroalkoxy alkanes (PFA), vinylidene fluoride (THV), and copolymers of perfluoromethylvinylether and tetrafluoroethylene (MFA).

3. The method of claim 1, wherein the fluoropolymer film comprises one or more fluoropolymers selected from the group consisting of fluorinated ethylene propylene (FEP), perfluoroalkoxy alkanes (PFA), vinylidene fluoride (THV), and copolymers of perfluoromethylvinylether and tetrafluoroethylene (MFA).

4. The method of claim 1, wherein the one or more fluoropolymers comprise one or more fluorinated monomers, wherein the fluorinated monomers include hexafluoropropylene, tetrafluoroethylene, ethylene-tetrafluoroethylene, perfluoroethers, and vinylidene fluoride.

5. The method of claim 1, wherein —$CF_3$ functional groups of the one or more fluoropolymers comprise at least about 10 wt. % of the fluoropolymer film as applied to the lithium-based host material.

6. The method of claim 1, wherein —$CF_3$ functional groups of the one or more defluorinated fluoropolymers comprise about 3 wt. % to about 10 wt. % of the SEI layer.

7. The method of claim 1, wherein the SEI layer comprises about 30 wt. % to about 50 wt. % LiF.

8. The method of claim 1, wherein the lithium-based host material comprises at least about 50 wt. % lithium.

9. The method of claim 1, further comprising removing a natural passivation layer from the exposed surface of the lithium-based host material onto which the fluoropolymer film is subsequently applied.

10. A method for manufacturing a battery cell, the method comprising:
providing an anode comprising a current collector and a lithium-based host material applied thereto;
applying a fluoropolymer film including one or more fluoropolymers to a plurality of exposed surfaces of the lithium-based host material;
defluorinating the fluoropolymer film by heating to produce a lithium anode having a solid electrolyte interface (SEI) layer comprising defluorinated fluoropolymers and at least about 5 wt. % LiF, wherein the heating occurs below the melting point of the lithium-based host material; and
subsequently assembling the battery cell by:
disposing a battery separator between a cathode and the lithium anode, and
disposing the battery separator, the cathode, and the lithium anode in an electrolyte.

11. The method of claim 10, wherein the electrolyte comprises a liquid electrolyte.

12. The method of claim 10, wherein applying is conducted under a vacuum and/or in an inert atmosphere.

13. The method of claim 10, wherein the one or more fluoropolymers are applied to the plurality of exposed surfaces of the lithium-based host material via a plasma-based process, and the heating at least partially occurs during the applying.

14. The method of claim 10, further comprising removing a natural passivation layer from the lithium-based host material prior to applying, wherein the heating that occurs during the applying effects a suitable extent of defluorination of the fluoropolymer film.

15. The method of claim 10, further comprising, after applying, transporting and/or storing the lithium anode in a non-inert environment prior to defluorinating.

16. The method of claim 15, wherein the one or more fluoropolymers are applied to the plurality of the exposed surfaces of the lithium-based host material via thermal evaporation or electron beam evaporation.

17. The method of claim 15, wherein the plurality of exposed surfaces of the lithium-based host material each comprises a passivation layer, and the plurality of passivation layers are not removed prior to applying.

18. The method of claim 10, wherein —$CF_3$ functional groups of the one or more fluoropolymers comprise at least about 10 wt. % of the fluoropolymer film as applied to the lithium-based host material.

19. The method of claim 10, wherein the SEI layer comprises about 30 wt. % to about 50 wt. % LiF.

* * * * *